United States Patent
Burstein et al.

[11] 3,785,778
[45] Jan. 15, 1974

[54] SMOKE ELIMINATING DEVICE

[75] Inventors: Norman Burstein, Cherry Hill; Richard C. Ditzler, Cinnaminson, both of N.J.

[73] Assignee: Smokontrol Corporation of America, Pennsauken, N.J.

[22] Filed: Mar. 23, 1971

[21] Appl. No.: 127,349

Related U.S. Application Data

[63] Continuation of Ser. No. 865,002, Oct. 9, 1969, abandoned.

[52] U.S. Cl. .............. 23/288 F, 23/288 J, 55/316, 219/393, 219/400, 423/213, 423/247
[51] Int. Cl. .............. B01j 7/00, B01j 9/04
[58] Field of Search ............ 219/388, 391, 393, 219/395, 396, 397, 374, 375, 381, 382; 23/288 F, 288 J, 288 R; 60/300; 423/212, 213, 219, 245, 247; 257/117

[56] References Cited
UNITED STATES PATENTS

| | | | |
|---|---|---|---|
| 3,533,753 | 10/1970 | Berger | 23/288 F |
| 3,672,824 | 6/1972 | Tamura | 23/288 R X |
| 3,691,346 | 9/1972 | Dyre et al. | 23/288 F X |
| 3,053,963 | 9/1962 | Dills | 219/391 X |
| 3,121,158 | 2/1964 | Hurko | 219/397 |
| 3,428,434 | 2/1969 | Hurko | 23/288 F |
| 3,505,030 | 4/1970 | Sowards | 23/288 R |
| 2,862,095 | 11/1958 | Scofield | 219/396 X |
| 3,507,627 | 4/1970 | Frant et al. | 23/288 F |
| 3,290,483 | 12/1966 | Hurko | 219/393 |
| 3,502,596 | 3/1970 | Sowards | 23/288 R |
| 3,513,294 | 5/1970 | Goolkasian | 219/393 |
| 3,536,457 | 10/1970 | Henderson | 219/396 X |
| 3,577,710 | 5/1971 | Feldman | 55/316 |

FOREIGN PATENTS OR APPLICATIONS

| | | | |
|---|---|---|---|
| 1,156,581 | 12/1957 | France | 219/393 |

*Primary Examiner*—Volodymyr Y. Mayewsky
*Attorney*—Morton C. Jacobs

[57] ABSTRACT

For eliminating combustible, carbon containing vapors or smoke, there is provided a device having an inlet hood capable of collecting smoke from a broiler or other cooker. The device has an outlet and a passageway between the hood and the outlet. In this passageway is a cellular, catalyst-coated refractory block threaded with high resistance electrical wire for heating the block cells. An impeller associated with the passageway draws the vapors through the heated block cells for combustion of the vapors and then forces them on through the outlet.

13 Claims, 5 Drawing Figures

PATENTED JAN 15 1974 3,785,778

INVENTORS
NORMAN BURSTEIN
RICHARD C. DITZLER
BY
Morton C. Jacobs
ATTORNEY

INVENTORS
NORMAN BURSTEIN
RICHARD C. DITZLER
ATTORNEY

SMOKE ELIMINATING DEVICE

BACKGROUND OF THE INVENTION

This invention relates to means for eliminating carbon containing, combustible vapors, such as are generated by food cooking stoves and grilles, ovens, and the like.

It is well known that when certain carbon containing foods are cooked, vapors are generated which contain much of the carbon in still combustible form. Thus, when hamburgers are grilled, vapors containing hydrocarbons of animal fat result. The air contaminated with these vapors is usually not only obnoxious to the olfactory sense, but also recognized to be polluted and not suitable for discharge freely into the open air, let alone directly into a restaurant area serving customers or into a kitchen. Various attempts have been made in the past to eliminate such vapors by means of catalytic-oxidation devices of the type described in U. S. Pat. Nos. 3,290,483, 2,962,987, 2,715,671, 3,397,154, and 2,988,432; that is, at high temperatures in the presence of precious-metal catalysts, there is efficient oxidation of the hydrocarbon molecules of such vapors. However, the devices provided heretofore for this purpose have been either rather expensive, inefficient, or otherwise limited in use, due to the costly precious-metal catalysts and to difficulties and complications in elevating the temperature of the contaminating vapors to that required for effective catalytic oxidation.

SUMMARY OF THE INVENTION

Accordingly, it is the primary object of this invention to provide an improved smoke or vapor control device which is effective to eliminate such vapors, is simple in construction, and readily lends itself to use with a variety of carbon containing smoke generating mechanisms.

Another and more specific object of this invention is to provide an improved smoke eliminating device which is particularly suitable for use with cook stoves, grilles, and the like.

Still another object of this invention is to provide an improved smoke eliminating device which will destroy noxious and/or harmful carbon containing vapors and thereby render the air more suitable for breathing, for horticulture, etc.

It is a further object of this invention to provide an improved smoke eliminating device which can be manufactured easily, which can be applied readily to existing heating mechanisms, which is highly efficient in operation, and which does not require skilled personnel for its manufacture, installation, or servicing when necessary.

According to one form of this invention particularly suitable for use with a cooking grille in restaurants, snack-bars, homes, or the like, there is provided a catalytic oxidation system for oxidizing the hydrocarbons and thereby purifying the air in the ambient. The system comprises a hollow, preferably metallic, casing having an inlet hood capable of being applied to a stove or a grille for receiving the vapors generated by the cooking appliance during cooking. The casing has an outlet opening and means therein which provides a passageway between the inlet hood and an outlet that may open into the room where the cooking takes place. Within this passageway is a honeycomb-like block of refractory material, with a large number of cellular passages whose walls are coated with an appropriate catalytic agent for aiding in the combustion of the carbon in the vapors. The honeycomb cells are threated with a high resistance electrical wire to provide heating of the cellular passages to a relatively high temperature. An impeller associated with the aforesaid passageway draws the generated vapors from the inlet hood up through the heated cellular passages of the block, where the contaminating vapors are efficiently oxidized, and then forces the decontaminated air out through the outlet opening.

BRIEF DESCRIPTION OF THE DRAWING

The foregoing and other objects of this invention, as well as the various features thereof, will be more fully understood from the following description of one embodiment thereof, when read in connection with the accompanying drawing, in which.

DESCRIPTION OF THE PREFERRED EMBODIMENT

Figure 1:
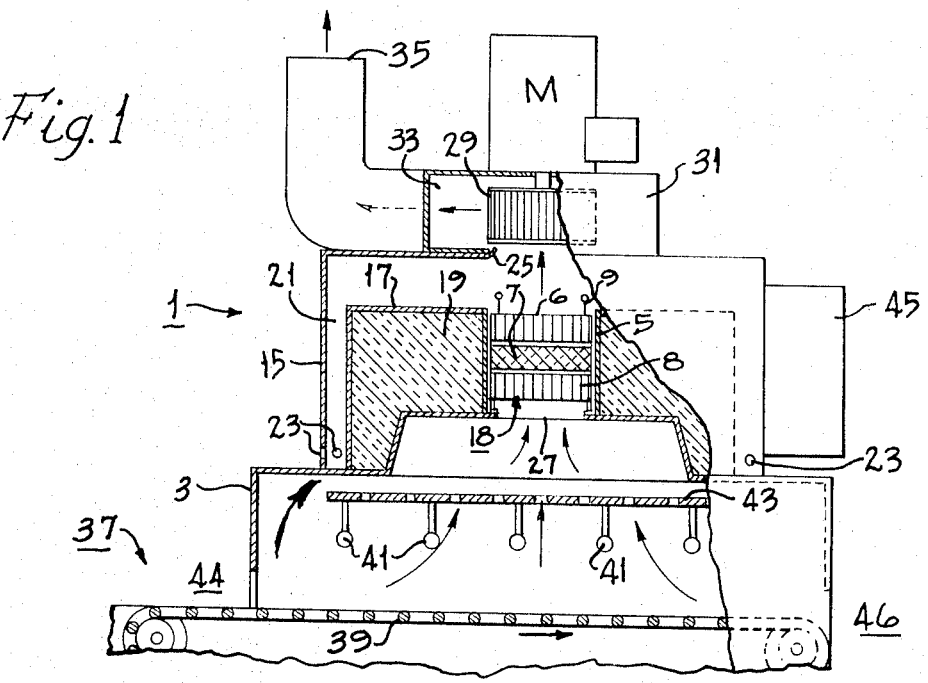
FIG. 1 is a side elevation, partly broken away and partly in section, of one form of the invention particularly suitable for use with a stove or cooking appliance.
Figure 2:
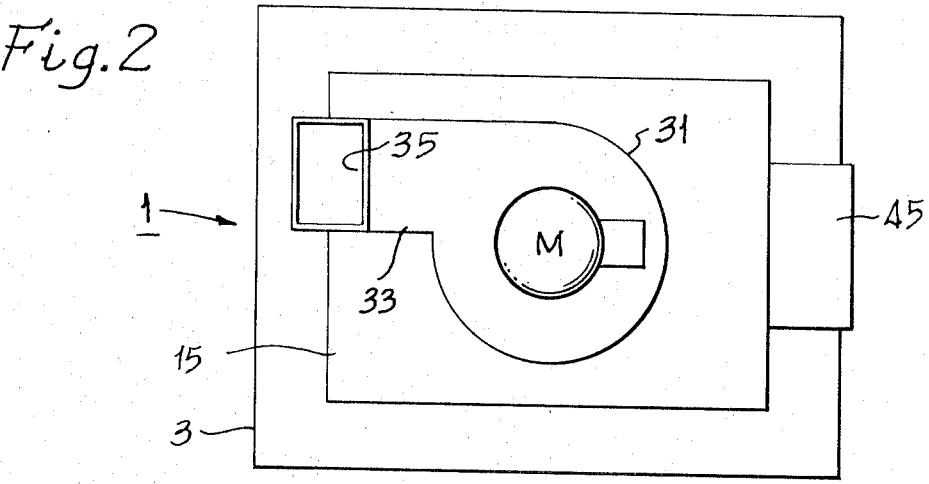
FIG. 2 is a top plan view thereof.

Referring more particularly to FIGS. 1 and 2 of the drawing, there is shown a smoke eliminating device formed of a casing 1, preferably of metal, such as stainless steel or aluminum, and having a flared hood or base 3 which acts as an inlet to the device. Above the hood 3 is a chimney passageway 5 within which is a block structure comprising at least three blocks 6, 7 and 8 of refractory material arranged in a sandwich-like fashion one above the other. Each of the outer blocks 6 and 8 has a plurality of cellular passages 10 arranged honeycomblike and extending therethrough; the individual cellular passages of the respective blocks 6 and 8 are formed, in one embodiment, generally parallel to each other, but preferably the passages in one block are not in axial alignment with those in the other. In addition, the passages 12 in the center block 7 are diagonally formed and twisted in configuration so that vapors can pass through them along paths that are irregular or non-straight, whereby the contaminated air hits the passage walls once and preferably more than once in passing through the blocks.

Each cellular passage of each of the three blocks 6, 7 and 8 has its walls coated with an oxidation catalyst of any suitable type (such as of the precious metals platinum and palladium), which may vary depending upon the application of the device. By way of example, the catalyst known as "platinum black" is suitable for devices to be used with cooking appliances. Threaded through the passages 10 of the uppermost block 6 in all but its outermost peripheral or marginal row of cells is an uninsulated electrical heating wire 9 of high resistance for heating the cellular passages to a relatively high temperature sufficient to produce oxidation of the combustible gas and solid ingredients of the waste vapors.

Figure 4:
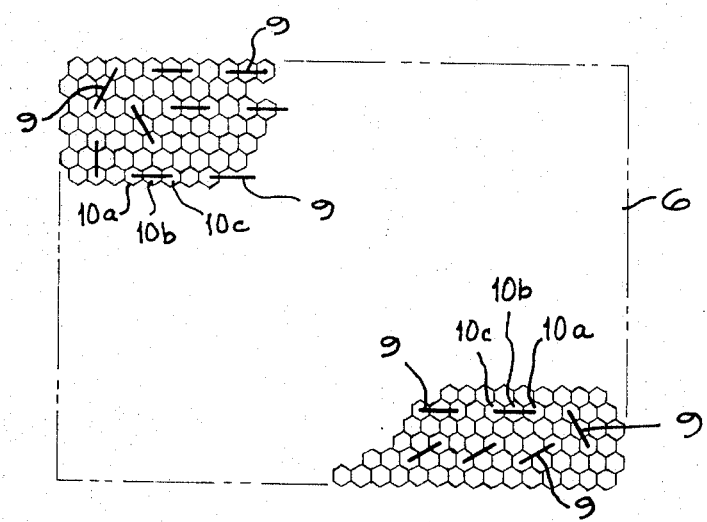
FIG. 4 is a fragmentary, bottom plan view of the lowermost one of the blocks of FIG. 3.
Figure 5:
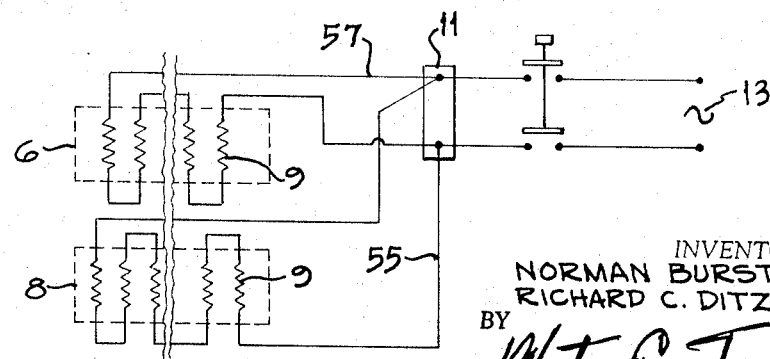
FIG. 5 is a wiring diagram showing how the electrical heating elements may be connected to a source of electrical energy.

In threading a wire 9 through the cellular passages 10, various patterns may be followed; for example, wire 9 is brought up through one passage cell 10, then across the end of that cell and the end of the next adjacent one, and then down through the cell adjoining the latter one, and so on. This pattern of through one cell 10a, skip a cell 10b, and oppositely through the next 10c (FIG. 4) is followed until all but the marginal rows of cells have been threaded. The skipped cells ensure that the wire sections do not touch and short out. The wide distribution of the wire 9 over the block 7 ensures that the air passing over the walls of its cells will become hot enough for the oxidation process. In a similar manner, another wire 9 is threaded through the corresponding passage cells 10 of the lowest block 8, which in material respects is the same as block 6. The ends of the two wires may be brought out and connected in parallel relation to a terminal block 11 for connection to a source of energy 13, as seen in FIG. 5, which may be a standard power line (e. g., 220 volts a-c). The center block 7 is used as a separator between the blocks 6 and 8, but it preferably has no electrical wire through its passages, which tend to be heated to a lower temperature than those of blocks 6 and 8. By using diagonal passages 12 in block 7, and passages that flow in cross-directions and have twists and turns, irregular flow paths are established through the unit to ensure that the contaminated air impinges against the heated catalytic wall surfaces.

Mounted on the base 3 is a housing 15 within which the central chimney 5 is formed. The housing 15 contains a chamber 17 that surrounds the chimney 5 and is filled with a heat insulating material 19 to maintain within the blocks 6, 7 and 8 of the oxidation chamber 18 the heat developed therein. Around the chamber 17, the housing 15 has a duct 21 formed with one or more intake vents 23 open to the ambient air. The roof of the housing 15 has an opening 25 in alignment with the chimney 5 and with a second opening 27 thereunder, and above the opening 25 is a motor driven impeller 29 within a housing 31. The housing 31 has a duct 33 leading to an exit opening 35, which it has been found may be in the same room where the cooking takes place.

A smoke eliminating device such as that described above may be used with any suitable cooker, such as the tunnel conveyor cooker shown, for example, in the Burstein Pat. No. 3,448,678, granted June 10, 1969. In FIG. 1 there is shown a part of such a cooker 37 having an endless conveyor belt 39 on which food is cooked by passing it along a path adjacent infra-red heating tubes 41, the rays from which are reflected downward by a diffuser plate 43. The hood 3 forms the tunnel enclosure of the cooker.

When a device like that hereinbefore described is used with a cooker such as that shown in the aforementioned patent, its flared base 3 is placed over the cooker above the path of travel of the conveyor and as close thereto as is feasible. The cooker 37 is open to the ambient at the input and output tunnel ends 44 and 46, and consequently a large flow of ambient air moves through the cooker and decontaminating system. Appropriate switches in or on a control box 45 are then closed (1) to supply electrical energy to the wires 9 for heating them, and (2) to start the motor of the impeller 29. As the food is cooked and it generates combustible hydrocarbon containing vapors, the rotating impeller draws the vapors along a passageway provided by the base 3, the opening 27, the cellular blocks 6, 7 and 8 within the chimney 5, and the opening 25 into the duct 33. Since the blocks 6, 7 and 8 become hot quite rapidly (say to about 500°–900° F), the hydrocarbon molecules in the air are quickly oxidized under the influence of the catalyst on the walls of the cells of the blocks 6, 7 and 8. From the duct 33, the impeller 29 forces the incinerated gas along the continuing passageway along the duct 33 and thence out through the opening 35 to the atmosphere. At the same time, the impeller draws cooler ambient air in through the vents 23 and passes it along the duct 21 to the opening 25 and the duct 33 where the air is mixed with the hot decontaminated air, after which the mixed air at a lower temperature than that from the oxidation chamber 18 is forced out through the outlet opening 35.

The cellular passage structure of each refractory block 6, 7 and 8 is covered with a precious metal and proves an extremely large catalyst surface. For example, in a 4 inch × 4 inch refractory block 6 or 8 about 1 inch thick, about 40 × 40 holes or passages may be formed, each such cellular passage being about 0.1 inch in average diameter. The cylindrical surface of each such passage is about 0.3 square inches, and 1600 such passages provide about 500 square inches of surface area in each block. As can be seen from the illustrative embodiment, this catalytic surface is many times greater than the surface of the threading heater wire. The coating of precious metal which forms the catalytic surface is the most expensive and the core element of the smoke eliminating system, in view of the high cost of precious metals such as platinum and palladium, and the need of such catalysts for efficient oxidation of contaminating hydrocarbon molecules. Due to this high cost, the catalytic oxidation chamber 18 formed by the cellular units 6, 7 and 8 is restricted in size, to provide most effective use of the previous metal surface. Thus, where the actual inlet of air into the tunnel cooker 37 is through the tunnel openings of about 100 square inches, the chamber 18 through which all of the contaminated air flows for oxidation is quite restricted, but a relatively few square inches in overall cross-section (e. g., 16 square inches in the 4 inch × 4 inch illustrative embodiment).

The heating of the air in the tunnel cooker (e. g., to 400° F) expands it to such an extent that there tends to be a backward movement and expansion of the contaminated cooking air into the kitchen environment. The impeller 29 is driven at a rate sufficient to prevent such backward movement, that is, at a rate sufficient to produce a negative pressure within the cooker as compared to the pressure of the ambient air, so that a pressure gradient is formed from the ambient air of the kitchen through the cooker 37 and through the catalytic chamber 18, so that all cooking vapors are drawn therethrough. In one form of the illustrative embodiment of the invention, the impeller is driven at a rate of 175 cubic feet per minute (CFM), so that the necessary pressure gradient is attained. About 25 to 50 percent of impeller-driven air is drawn as ambient air through vents 23 and passages 21 to bypass the catalytic chamber 18 so as to cool the hot decontaminated air, which may then be returned back into the kitchen or into any area in which a highly heated exhaust would be objectionable. Thus, about 80 to 130 CFM of air are actually forced through the oxidation chamber 18. This chamber is heated by the threaded heater wire 9, preferably to 900° F, in order to achieve a very high efficiency in the oxidation and breakdown of contaminating hydrocarbon molecules. It must be maintained at such temperatures notwithstanding a large quantity of air that is rapidly moved through the chamber. In the illustrated heating system of FIG. 1, used with a tunnel cooker, the cooker tunnel is open to the ambient air, whereby a very large quantity of moving air (a good proportion of which is at near-ambient temperatures) must be heated to the indicated temperatures to obtain effective catalytic oxidation. The air speed is necessarily increased by the restriction of the passage through the oxidation chamber 18.

It has been found with the above described unit that about 4,000 watts are required to heat the threaded passages 10 of the unit to 900° F. That is, in a 200-volt line, about 20 amperes are effective to do this job of heating the indicated large quantity of air. This is a very much smaller electrical energy requirement than would be required in any other known heat exchange system; for example, one in which the air is heated before being supplied to the oxidation chamber.

Where the cooking unit is partially closed, i. e., not completely open to the ambient air, as in a peanut roasting machine, it is only necessary to move a relatively small quantity of air so that a proportionately small amount of electrical energy would be required to elevate the air to the required temperatures (e. g. 900°F) for catalytic oxidation. Where a canopy is provided for ensuring an up draft in an entire kitchen having griddles, fryers, and the like, the quantity of air to be moved may be ten to twenty times as much as that described in the illustrative embodiment. In addition, a larger amount of electrical energy would be required to elevate the temperature of the air, a large proportion of which is at ambient temperatures. However, in each of these forms of the invention, by having the wires directly in the passageways that are coated with the precious-metal catalyst, a high degree of heating efficiency is achieved.

It has been difficult to measure precisely the heating action that takes place in the catalytic chamber, and the following is the best estimate of what has been observed. The air flowing over the hot wire (which may itself be at a temperature of about 1,600° F) seems to be heated somewhat, but only a small amount compared to the heating of the catalytic chamber 18 by the wire 9, and the air, in turn, by the chamber 18. The refractory material has a high heat capacity, and it retains the heat for maintaining the precious-metal catalyst at the high temperatures needed for catalytic oxidation, notwithstanding the large amount of heat needed to elevate the temperature of the contaminated air as it flows past and contacts the catalytic surface. Thus the catalytic chamber 18 is itself a heat exchange unit, whereby a very high degree of efficiency is achieved, since the threaded heater wire inserts a large quantity of heat energy into each block 6 and 8, and since substantially all of the heat is used to elevate and maintain the temperature of the catalytic surface, and thereby of the contaminated air as it passes through the passages and contacts the catalytic wall surfaces thereof. A refractory material is actually a very efficient heat insulator (as well as an electrical insulator) and does not transfer the heat effectively through as much as one-hundredth of an inch of refractory material. For example, whereas temperatures in excess of 900° F are achieved in passages threaded directly by a heater wire 9, temperatures of 500° or less may exist in immediately adjacent passages that are unthreaded. Thus it is desirable to have as low heat transmission characteristic as possible in the material between the holes in order that the critical catalytic temperatures in all holes be as efficiently high as possible. The greatest efficiency of oxidation occurs at the higher 900° F temperature, though some hydrocarbon molecules oxidize at lower temperatures such as 500° F.

The diameter and length of the passages through the catalytic unit is selected to ensure a large catalytic surface area consistent with an arrangement of passages so that the contaminated air, as it flows therethrough, tends to impinge against the catalytic surface of the passage walls for effective oxidation Thus the passages may be made small in diameter compared to length, and also irregular or awry (e. g., passages 12) in shape, in order to produce a turbulent flow of air that will tend to impinge against the passage surface once or more as it passes therethrough, so that substantially all of the hydrocarbon molecules are subjected to catalytic oxidation. In the illustrative embodiment this is achieved in the fashion indicated, and in addition the passages of the upper and lower unit are not in alignment, and the out-of-alignment condition is accentuated by the slanted and cross-flow construction of the center-unit passages 12, so that generally all of the air contacts a catalytic surface in its passage through the unit, and preferably a surface at 900° F. It has been found that this unit has an extremely fast response time relative to that of other heat exchange units, e. g., relative to that of a plenum chamber in which the contaminated air is heated prior to flowing through the catalytic surface. Due to the direct heating of the catalytic chamber of this invention, it is operational as a decontaminating device within a few minutes after the operating switch is turned on.

As indicated above, this invention is especially suitable for open systems in which a large quantity of low-temperature air has to be heated to the high temperatures suitable for catalytic oxidation. By heating the oxidation chamber 18 so that its catalyst-coated passages, in turn, heat the air, an efficient heat exchanger is achieved directly at the surfaces at which the oxidation takes place. The catalytic chamber may be quite compact with long passages arranged to furnish a large catalytic surface area; the air heating system via the passage walls is effective notwithstanding the increased air speed required for passage of a large quantity of air through the compact cross-sectional flow area of the chamber. The long flow path through passages 10 and 12 is not straight to ensure that the air hits the heating and catalysis surfaces of the passage walls.

Figure 3:
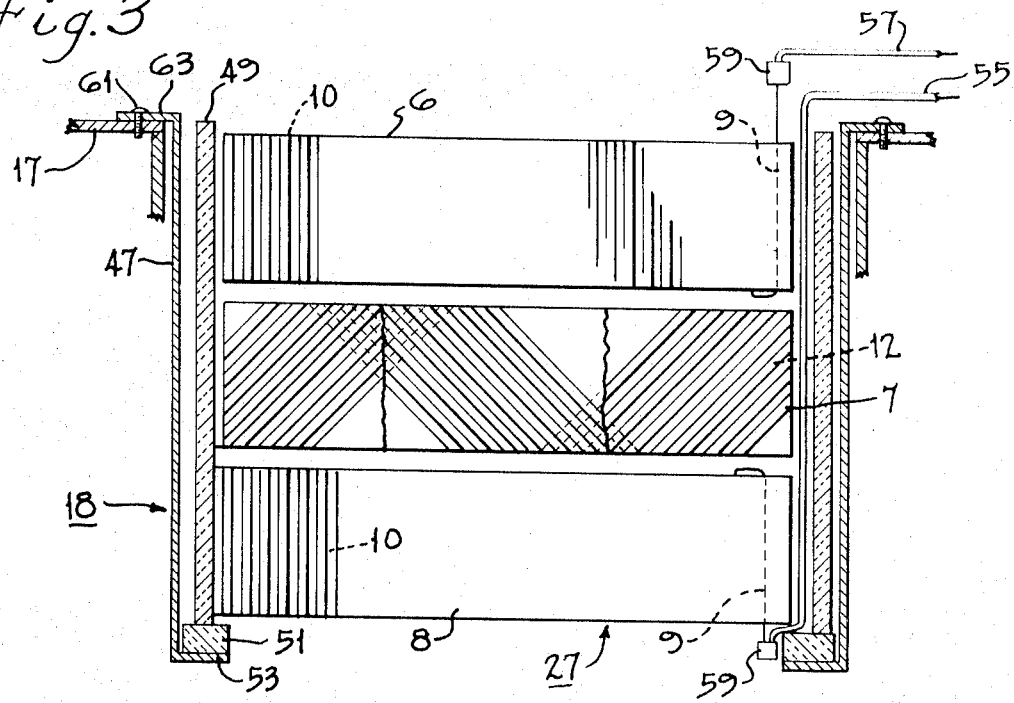
FIG. 3 is an enlarged side elevation of the oxidation unit and the individual ceramic blocks thereof that form part of the device.

As shown in the enlarged view of the oxidation chamber 18 of FIG. 3, the three blocks 6, 7 and 8 are assembled one above the other in a rectangular stainless steel pot 47 that is open at the bottom, to provide the inlet 27, and at the top for the outlet thereof. Flat asbestos lining boards 49 are inserted between the side walls of the pot and the blocks 6, 7, 8. Rectangular strips 51 of asbestos are inserted between the bottom outer edge of block 8 and an inwardly directed flange 53 around the bottom of the pot 47; the block 8 rests on and is supported by the asbestos strips 51. The high resistance heater wires 9 (e. g., an alloy of aluminum-cobalt-chromium-iron) of blocks 6 and 8 are electrically connected to lead-in wire sections 55 and 57 (e. g., of thicker, low-resistance nickel wire) in connector caps 59. The temperature at the caps 59 outside of the blocks 6 and 8 is relatively low without adverse effect on the connections and on the leads to the terminal block 11.

The preferred embodiment of FIG. 3 illustrates the self-contained unit of the heat exchanger and catalytic chamber of this invention. The unit is removed by removal of screws 61 that secure flanges 63 around the top of the pot 47 to the wall of the insulating chamber 17. The lead wires 57 and 59 are readily disconnected from the terminal block 11 and a complete new unit inserted in its place and secured. In this way, servicing of the core unit of the apparatus is simplified and can be performed readily in the field without special training of personnel.

Although emphasis has been placed herein on a form of this invention which is particularly useful with a food cooker, it will be apparent to those skilled in the art that it is susceptible of various changes in design and structure, all coming within the scope of the present inventive concept. For example, if desired, the center block 7 may be of the same parallel-passage construction as blocks 6 and 8, but mounted so that its passages are not in alignment. Various threading patterns may be used for the heater wire to thread as many passages as practical. Other changes and/or additions within the spirit of this invention may also be made where found desirable. Also, it will undoubtedly be obvious to those skilled in the art that this invention can be varied readily to make it useful with other devices requiring decontamination of the polluted air therefrom, such as incinerators, commercial and/or industrial ovens, and the like. It is desired, therefore, that the foregoing be taken merely as illustrative and not in a limiting sense.

What is claimed is:

1. For use with cooking apparatus, a smoke eliminating device comprising:
   a. a hollow casing having a hood for use with said cooking apparatus to serve as an inlet for receiving and directing vapors from said cooking apparatus into said device, said device also having an outlet,
   b. means providing a passageway between said inlet and said outlet,
   c. a heat exchanger and catalytic chamber in said passageway between said inlet and said outlet and having cellular passages through which air containing said vapors must pass in traveling along said passageway to said outlet, the walls of said cellular passage having an oxidation catalyst, said heat exchanger and catalytic chamber including electrical heating means in a plurality of said cellular passages, said heating elements comprising high resistance electrical wire threaded through said cellular passages, and
   d. an impeller mounted in said casing and used with said passageway for drawing air therethrough and including means for drawing air from said apparatus into said inlet and to said outlet through said heat exchanger and catalytic chamber.

2. A smoke eliminating device according to claim 1 characterized in that said passageway has at least one additional inlet opening in communication with the atmosphere in advance of said impeller.

3. A smoke eliminating device according to claim 1 characterized in that said heat exchanger and chamber further includes a member of refractory material having said cellular passages coated with said oxidation catalyst.

4. A smoke eliminating device according to claim 3 characterized in that said member comprises at least three adjacent blocks arranged in sandwich fashion and each having catalyst coated cellular passagew that are interconnected in awry flow paths so that flowing air tends to impinge on the walls of said passages, said heating elements comprising high resistance electrical wire threaded through cellular passages of only the outer blocks of said member.

5. A smoke eliminating device according to claim 4 wherein said electrical wire is threaded continuously through said passages of said end blocks first in one direction through a given passage, then across the end of said given passage to a second passage displaced from said given passage, and then in the opposite direction through said second passage.

6. A smoke eliminating device according to claim 1 wherein said passageway has a cross-sectional flow area that is substantially less than that of said inlet.

7. A smoke eliminating device comprising:
   a hollow casing containing therein an inlet for receiving contaminated air and an outlet;
   a heat exchanger and catalytic chamber in said hollow casing between said inlet and outlet and providing an air path therebetween; said heat exchanger and catalytic chamber including a block having elongated passages extending through the block with the walls thereof covered with a catalytic material, and an electric heater means in a plurality of said passages for heating said block whereby air is heated and air contaminants are oxidized as the air passes through said passages and impinges against the walls thereof, said electric heater means including a high resistance wire threaded through a plurality of said passages.

8. A smoke eliminating device according to claim 7 and further comprising an air impelling device in said casing for drawing air into said inlet and through said heat exchanger and catalytic chamber.

9. A smoke eliminating device according to claim 7 wherein said block is formed of refractory material having through passages.

10. A smoke eliminating device according to claim 7 wherein said heat exchanger and catalytic chamber include at least one additional block having elongated passages with the walls thereof covered with catalytic material and means for retaining said blocks as a unit, whereby said heat exchanger and catalytic chamber can be assembled as a unit and readily removed as a unit for servicing or replacement.

11. A device as recited in claim 7 wherein said passages are generally parallel to each other.

12. A device as recited in claim 7 wherein said electrical resistance wire for a plurality of said passages are connected in series circuit relation.

13. A device as recited in claim 7 wherein said electrical resistance wire for a plurality of said passages is connected in parallel circuit relation.

* * * * *